(12) United States Patent
Cao et al.

(10) Patent No.: US 6,610,255 B1
(45) Date of Patent: Aug. 26, 2003

(54) VANADIUM REMOVAL IN FCC BY USE OF AN OUTBOARD VESSEL

(75) Inventors: Guang Cao, Branchburg, NJ (US); Todd Richard Steffens, Randolph, NJ (US); Gordon Frederick Stuntz, Baton Rouge, LA (US); Daniel Paul Leta, Flemington, NJ (US); William Russell Adamson, Randolph, NJ (US); Albert Yuan-Hsin Hu, Baton Rouge, LA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 09/568,864

(22) Filed: May 9, 2000

Related U.S. Application Data

(63) Continuation of application No. 09/110,088, filed on Jul. 2, 1998, now abandoned.

(51) Int. Cl.[7] .................................................. B01J 8/08
(52) U.S. Cl. ........................ 422/144; 422/139; 422/145; 422/147; 502/41

(58) Field of Search ................................. 422/139–146, 422/147; 502/41, 516, 521; 208/113, 120, 164; 165/104.16

(56) References Cited

U.S. PATENT DOCUMENTS

| 4,923,834 A | * | 5/1990 | Lomas ....................... 422/144 |
| 5,260,240 A | * | 11/1993 | Guthrie et al. ................. 502/41 |
| 5,286,691 A | * | 2/1994 | Harandi et al. ............. 422/144 |

* cited by examiner

*Primary Examiner*—Hien Tran
(74) *Attorney, Agent, or Firm*—Ronald D. Hantman; Erika Singleton Wilson

(57) ABSTRACT

A fluid catalytic cracking (FCC) process performed in a FCC process unit containing a reactor, a regenerator and an outboard vessel. Catalyst particles containing vanadium are circulated back and forth from the reactor to the regenerator and back and forth from the regenerator and the outboard vessel. The outboard vessel contains a vanadium trap material that removes vanadium from at least a portion of the catalyst particles.

5 Claims, 2 Drawing Sheets

VANADIUM REMOVAL IN FCC BY USE OF AN OUTBOARD VESSEL

This is a continuation of application Ser. No. 09/110,088, filed Jul. 2, 1998, now abandoned.

BACKGROUND OF THE INVENTION

This invention relates to a system for the removal of metal poisons from fluidized catalytic cracking catalyst for converting hydrocarbons containing one or more metal poisons (vanadium or nickel).

One major operation in the modern refinery is the process of catalytic cracking. In this process, some of the heavier oils (often called "gas oils") produced upon fractionation of whole crude oil are decomposed or "cracked" using fluidized zeolite-containing catalysts.

As the supply of light, sweet crude oils has dwindled during past years, catalytic cracking has become increasingly important in maintaining a supply of hydrocarbons suitable for use in various fuels such as gasoline. A problem that has occurred because of the increasing use of heavier, more sour crudes is that the heavier crudes contain substantially more organic metal compounds, such as vanadium and nickel porphyrins. These metals cause many undesirable reactions in heavy oil cracking in that the metals, specifically nickel and vanadium are quite harmful to the fluidized cracking catalysts used. These metals, present in the high-boiling fractions, deposit on cracking catalyst and accumulate with time. They act as poisons and have the resulting effect of increasing undesirable hydrogen and coke yields, decreasing the selectivity of the catalyst in making liquid products. It is also established that vanadium also attacks the zeolite itself, the high activity component of a catalytic cracking catalyst.

While the mitigation of Ni has been reasonably successful by using group V element additives, the solution for vanadium has remained elusive. The vast majority of prior art has dealt with the additive approach, the addition of so-called "trapping agent" into FCC system either with the catalyst or with hydrocarbon feed. This passivation procedure may be seen in, e.g., U.S. Pat. Nos. 4,377,494 (barium); 4,451,355 (calcium); 4,473,463 (barium); and 4,824,815 (strontium). In addition to its obvious drawback of diluting catalyst activity, this approach of using additive trapping particles has suffered from lackluster V trapping performance. The reason is that the multitude of reactive conditions in FCC system interferes with the V trapping chemistry of most V traps. For example, it has been recognized that the presence of $SO_x$ in regenerator interferes with V-trapping chemistry. U.S. Pat. No. 5,324,416 teaches that V-trapping is more effective with the simultaneous use of $SO_x$ transfer agents. This invention has a number of advantages over prior art: (1) no catalyst activity dilution; (2) it isolates V trapping from $SO_x$ and reducing environments, so that some effective V trap materials (Those that are also susceptible to $SO_x$) such as the divalent metal oxides can be used; (3) V trapping is done under conditions that can be tuned to optimize V transfer rate while keeping hydrothermal deactivation of zeolite catalyst in the vessel at minimum; (4) because the vessel may be simultaneously used as a catalyst cooler, it may allow handling of more Conradison carbon (concarbon) in hydrocarbon feed; (5) depending on the concentration of V gathered by the trap, the V laden trap might be of value as source of vanadium metal.

Other V mitigation strategies include the use of V-trapping agent in isolated environment. U.S. Pat. No. 5,286,691 (Mobil) teaches the use of large V-trap particles which remain in the FCC regenerator (and is exposed to $SO_x$ environment), and U.S. Pat. No. 5,260,240 (Chevron) teaches the use of V-traps in a external reactor. The V-ladden FCC catalyst is charged into the reactor and the operation is non-continuous.

SUMMARY OF THE INVENTION

The present invention is a fluidized catalytic cracking system which includes a fluidized catalytic cracking reactor, a conventional regenerator, and an outboard vessel containing a vanadium trapping material. Vanadium contaminated catalyst is circulated from regenerator to outboard vessel where the catalyst is fluidized with the V trap and vanadium is removed from the catalyst. Optionally the vessel may have features of a catalyst cooler to help lower the regenerator temperature.

DESCRIPTION OF PREFERRED EMBODIMENT

This invention discloses a system which includes means to remove contaminant vanadium in FCC system. It is specifically concerned with the use of an outboard vessel that is adjoined to the FCC regenerator. Such a vessel sets up a circulation of regenerated FCC catalyst from and back to the regenerator. It contains millimeter size, properly formulated inorganic oxide particles (V trap) that are capable of trapping vanadium (forming stable metal vanadate).The vanadium trapping particles are between 0.1 mm and 5 mm in diameter. The outboard vessel is between $\frac{1}{100}$ and ½ of the generator. Under specific operating conditions these particles are fluidized with the FCC catalyst (cat) particles but, because of their much larger size, do not circulate with them. For conditions required for this segregated fluidization of particles of different sizes, see "Fluidization Engineering" by Kunii and Levenspiel, 1977, Robert E. Krieger Publishing, Huntington, N.Y., or "Fluidization and Fluid Particle Systems" by Zenz and Othmer, 1960, Reinhold Publishing, New York. During contact in the vessel, vanadium on catalyst is transferred to the trap particles. The fluidizing gases (air and steam) for the vessel make $SO_x$ partial pressure in the vessel much lower than in the regenerator, reducing the interfering effect of $SO_x$ with V trapping to a minimum. The spent V trap particles can be withdrawn from the vessel and fresh V trap can be added. The net result is the removal of vanadium from FCC system. The outboard vessel may also serve as a heat exchanger, allowing the temperature of the regenerator to be better controlled and more concarbon to be handled.

Examples of an on-board heat exchanger (cat cooler) can be found in U.S. Pat. No. 4,923,834, U.S. Pat. No. 4,439,533, and U.S. Pat. No. 4,396,531. These heat exchangers are vessels adjoined to FCC regenerator in much the same manner as the V trapping vessel. They allow catalyst to flow through the shell side of the heat exchanger and a cooling medium through the tube side. Similar heat exchanger tubes may be installed inside the outboard vanadium trapping vessel of the invention and cooling of catalyst may be effected by passing a cooling medium, such as water, through the tube side.

Figure 1:
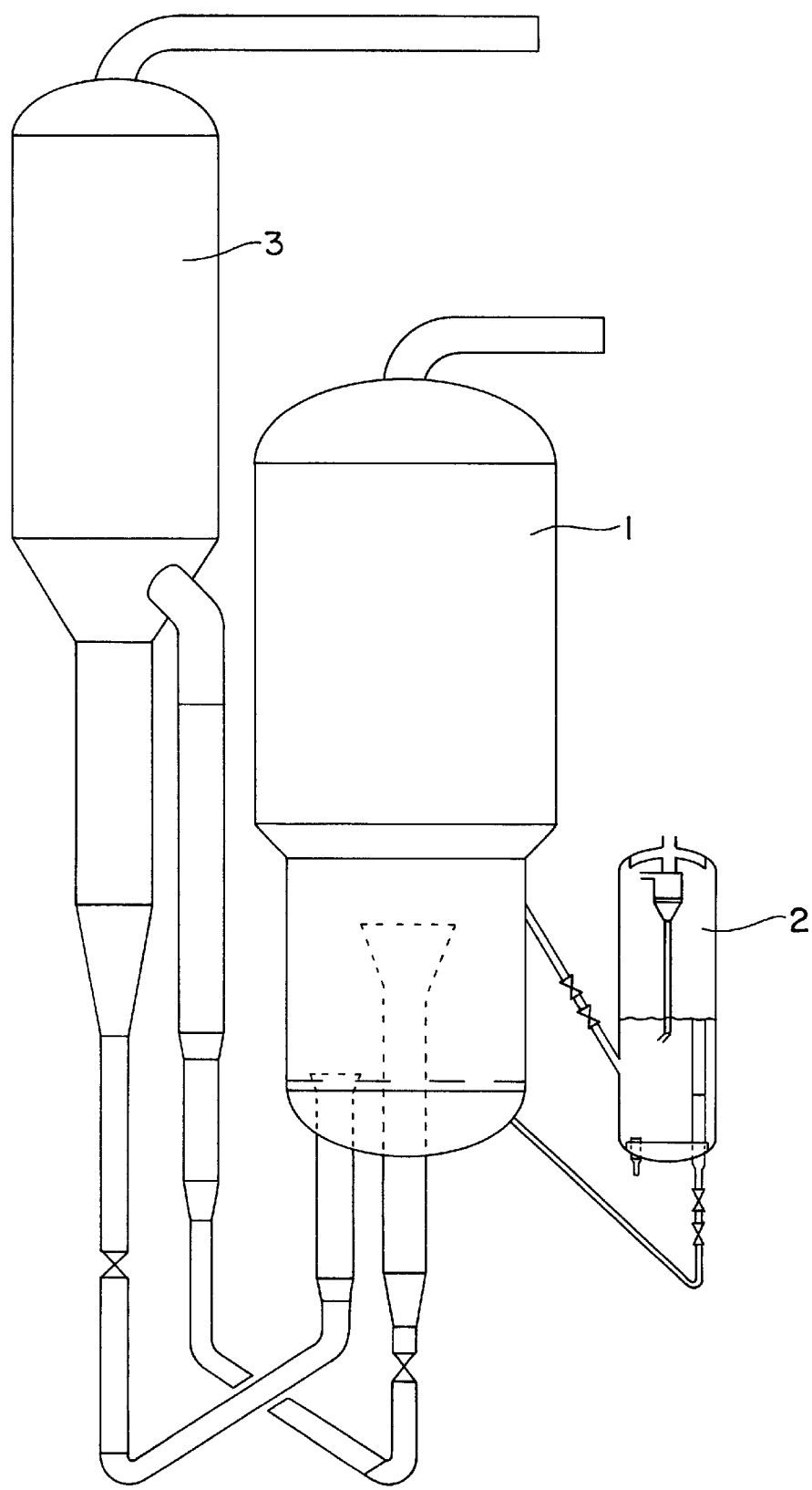
FIG. 1 shows a schematic diagram of the present invention.

FIG. 1 shows a schematic diagram of the main structures of the FCC system of the present invention. The system includes a reactor (3), a regenerator (1) and an outboard vanadium removing vessel (2).

Figure 2:
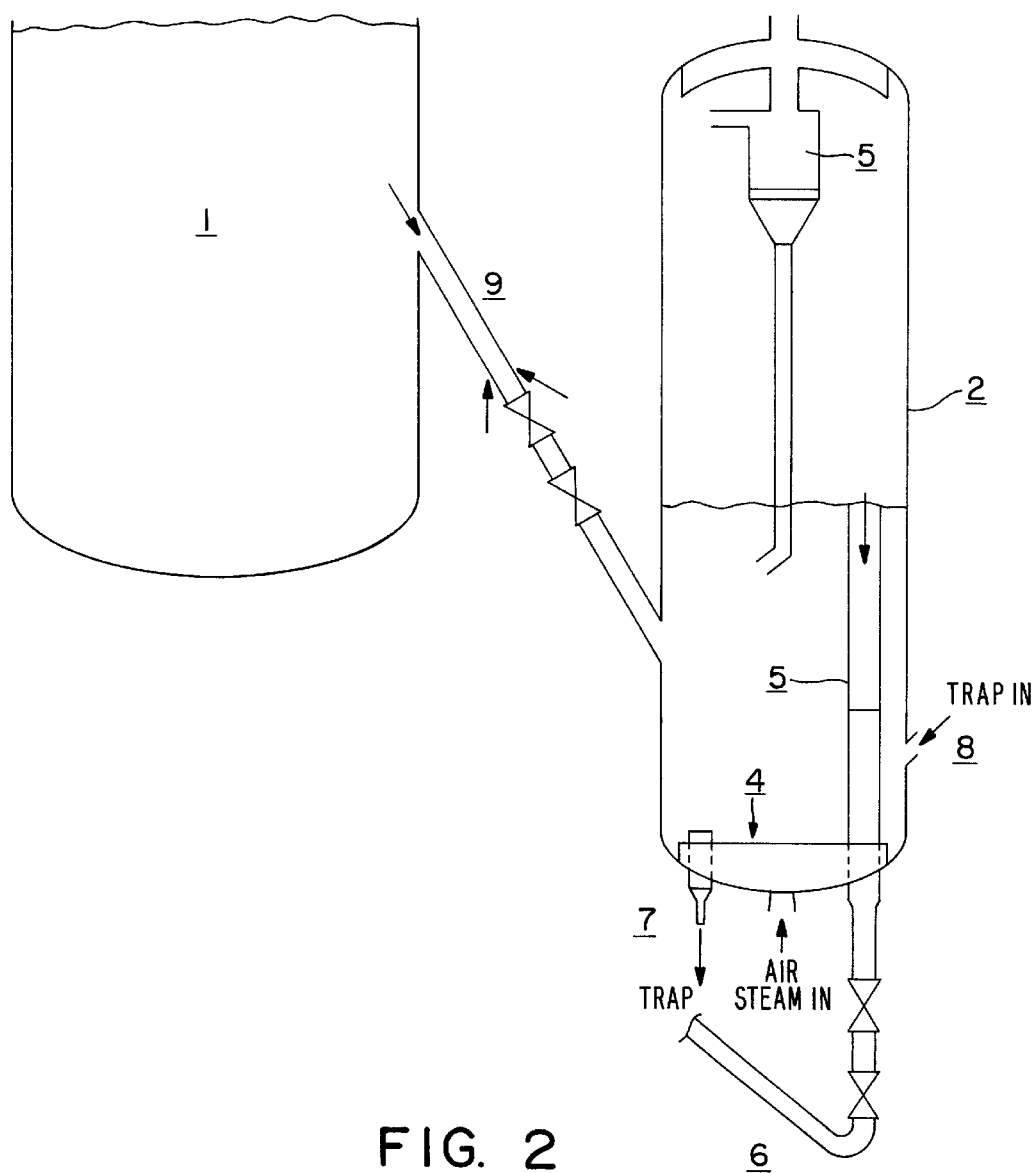
FIG. 2 shows a schematic diagram of a sub-assembly of the present invention.

FIG. 2 shows a schematic diagram of the outboard vanadium removing vessel that is a subassembly of one embodiment of the present invention. The invention involves the use of a vessel with which vanadium on FCC catalyst is continuously removed as part of normal FCC operation. The vessel is connected to a conventional FCC regenerator. A non-limiting illustration of how the vessel works in a typical operation is as follows: a slip stream of the regenerated catalyst in the regenerator (1) is continuously fed into the vanadium removing vessel (2) through an angled transfer line 9 with slide valves. Air and steam are fed to the vessel from the bottom of the vessel through a distribution grid (4) to fluidize a bed of FCC catalyst and V trap particles which are much larger than FCC particles. The velocity of the fluidization gases is such that vigorous fluidization of all particles is achieved and yet only the catalyst particles, due to their smaller size, are carried to the upper zone of the vessel and they are captured by a cyclone (5) and returned to the lower zone of the vessel. An optional fanning-out feature in the upper portion of the vessel, for reducing the linear velocity of the fluidized particles, may also be included. So, in the vessel, a segregated fluidization zone is attained with FCC catalyst on top and V-trap particle-rich phase at the bottom of the bed. An overflow well may be used to control the inventory. A J-bend transfer line (6) with a slide valve takes the catalyst with reduced V level back to the regenerator. After a certain period of operation when the V trap materials reach their trapping capacity or their V trapping activity needs to be regenerated, the trap material may be withdrawn from the vessel through elutriator-like withdrawal system (7). Regenerated or fresh V trap materials can be charged into the vessel through a side opening (8) in the vessel.

In order to ensure that $SO_x$, partial pressure in the vessel is at a minimum, a "bubble-up" purge with steam and/or air on the angled transfer line (9) may be optionally included.

EXAMPLE 1

Preparation of V Loaded FCC Catalyst 500 g of an Orion series commercial Fluid Catalytic Cracking catalyst was wetted with a solution of 83.3 g vanadyl naphthenate (3.2% V) in 175 g toluene to achieve uniform incipient wetness. The mixture was dried in a vacuum oven at 70° C. and then was calcined at 600° C. for six hours to burn off carbon residue. Vanadium on the support analyzed by elemental analysis: 5000 PPM.

EXAMPLE 2

Preparation of V Trap Materials

Metal (Mg, Ca, Sr, Ba, La) nitrate or carbonate was first dissolved in water or dilute nitric acid. The salt solutions was used to wet a commercially available macroporous silica support which was in the form of one millimeter cross section granules and had a macroporous structures with pore size distribution around 150Å. The desired level of metal loading was achieved by varying the salt solution concentration. The metal salt loaded materials were dried in a vacuum oven at 70° C., and then calcined at 200° C. for 30 minutes and at 500° C. for 2 hours consecutively. The exact loading of metal on the silica support was determined by elemental analysis.

EXAMPLE 3

Fluidization of V Loaded Catalyst and Metal Oxide Loaded Silica—The Effect of Steam Partial Pressure A 1:1 mixture of V loaded FCC catalyst as prepared in Example 1 with SrO loaded silica as prepared in Example 2 (3.51% Sr) was fluidized in a tubular reactor at 700° C for four hours. Fluidization was effected by passing a stream of air and steam with varied steam partial pressure. The total pressure was one atmosphere and the superficial velocity of the stream was sufficient to cause vigorous fluidization of both the catalyst and the much larger trap particles. After the cofluidization the reactor was cooled and the solids discharged and separated by sieving. The V level on the trap was analyzed by elemental analysis. The results showing the effect of temperature and steam partial pressure are as follows:

| Steam partial pressure, % of 1 atm | 10 | 20 | 30 | 40 |
|---|---|---|---|---|
| V on SrO/Silica, PPM | 515 | 848 | 1190 | 1570 |
| Average Trapping Rate, % V/hour | 3.33 | 4.25 | 5.95 | 7.85 |

EXAMPLE 4

Fluidization of V Loaded Catalyst and Metal Oxide Loaded Silica—The Effect of Temperature A 1:1 mixture of V loaded FCC catalyst as prepared in Example 1 with SrO loaded silica as prepared in Example 2 (3.51% Sr) was co-fluidized in a tubular reactor at predetermined temperatures for two hours. The fluidization was effected by passing a stream of air and steam (70:30 mole ratio), under one atm total pressure. The superficial velocity was sufficient to cause vigorous fluidization of both the catalyst and the much larger trap particles. After the cofluidization the reactor was cooled and the solids discharged. The catalyst and trap were separated by sieving and the V level on the trap was analyzed by elemental analysis. The results showing the effect of temperature are as follows:

| Temperature,° C. | 650 | 675 | 700 | 725 |
|---|---|---|---|---|
| V on SrO/Silica, PPM | 560 | 686 | 750 | 905 |
| Average Trapping Rate, % V/hour | 5.60 | 6.86 | 7.50 | 9.05 |

This example illustrates that under conditions comparable to those found in the regenerator (typically 700° C. and steam partial pressure of 15% of 2 atm total pressure) a vanadium trapping rate of 300–450 PPM/hour, or 6–9% V on catalyst/hour, is attainable in the vessel of this invention with appropriate designed, millimeter size V trap materials.

EXAMPLE 5

Process Conditions

In order for the outboard vessel to effectively trap vanadium and to be economically feasible, a preferred embodiment for the vessel size and the process condition are defined as the following:

| Size of vessel | 1/100–1/5 of the regenerator size |
|---|---|
| % of cat inventory in the vessel | 0.5–20 |
| Cat flow rate through the vessel, tons/day | 300–50,000 |
| Residence time in the vessel, minute per pass | 0.01–30 |
| Tons of trap particles in vessel | 1–50 |

| -continued | |
|---|---|
| Fluidizing gas for the vessel | 5–100% steam, make up air |
| Pressure in the vessel | 0–50 psig |
| Temperature, ° F. | 1200–1600 |

The following example shows a typical operation and its effectiveness for vanadium removal:

| Assuming the following FCC operation conditions: | |
|---|---|
| total cat inventory, tons | 450 |
| barrel of feed per day | 50,000 |
| and conditions in the outboard vessel: | |
| % cat inventory in vessel | 5 |
| cat residence time per pass, minutes | 1–10 |
| tons of trap in vessel | 22.5 |
| therefore the following numbers: | |
| tons of cat in vessel | 22.5 |
| flow rate through vessel, tons/day | 300–50,000 |
| cat residence time in vessel per day, min. | 72 |

Using vanadium trapping rate of 5%/hour, one obtains 6% vanadium removal on total cat inventory. If one further assumes that equilibrium catalyst has 5000 PPM V, 6% vanadium represents 0.135 ton vanadium removal per day with the vessel (450 tons×5000×10%×6%=0.135 ton). This translates into an additional 18 PPM vanadium from the feed (0.135/(50,000 bl×300/2000)=18 PPM).

What is claimed is:

1. A fluidized catalytic cracking (FCC) system comprising a fluidized catalytic cracking reactor including a catalyst, a regenerator connected to said reactor for removing coke from said catalyst, an outboard vessel containing a vanadium trapping material having a particle size from about 0.1 mm to about 5 mm in diameter, and a means for continuously transferring said catalyst to said vessel and back to the regenerator said means including an angled-transfer line from the regenerator to said vesel wherein said trapping material remains in said outboard vessel as said catalyst continuously moves between said vessel and said regenerator at a flow rate through said outboard vessel of between about 300 and 50,000 tons/day, wherein said angled-transfer line includes a bubble-up purge with steam and/or air to ensure that $SO_x$ partial pressure is at a minimum in said vessel.

2. The FCC system of claim 1 wherein said catalyst and said vanadium trapping material are particles wherein the catalyst particles are of a different size from the vanadium trapping particles.

3. The FCC system of claim 1 further comprising a means for fluidizing said vessel.

4. The FCC system of claim 3 wherein said means of fluidization is air and/or steam passing through said vessel.

5. The FCC system of claim 1 further comprising means for transferring vanadium trapping material in and out said vessel.

* * * * *